Oct. 30, 1945.    R. W. OLSEN    2,388,073
FLUID FLOW CONTROL
Filed April 29, 1941    3 Sheets-Sheet 1
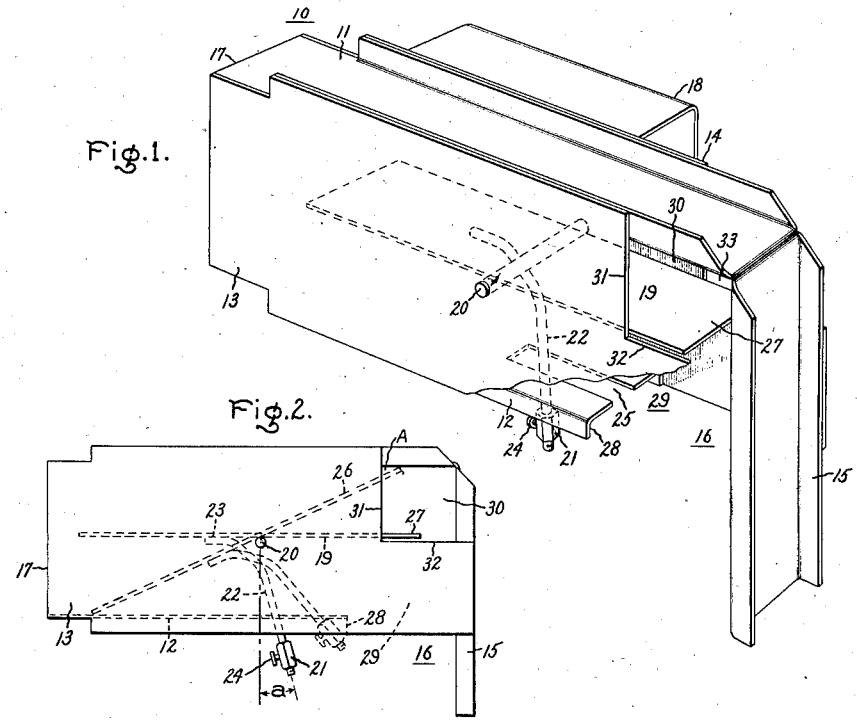
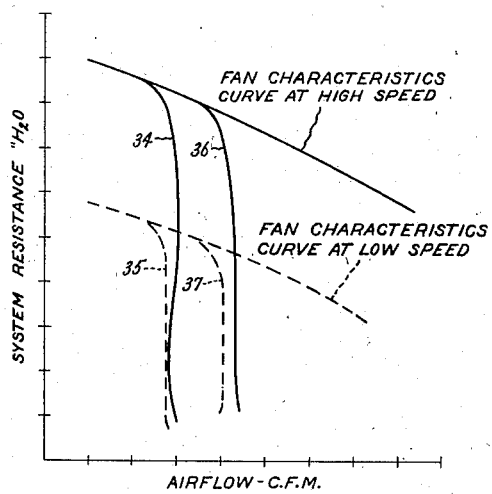
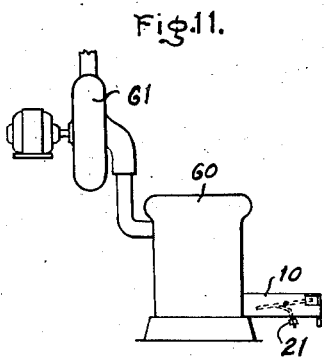
Inventor:
Ronald W. Olsen,
by Harry E. Dunham
His Attorney.

Oct. 30, 1945. R. W. OLSEN 2,388,073
FLUID FLOW CONTROL
Filed April 29, 1941 3 Sheets-Sheet 2
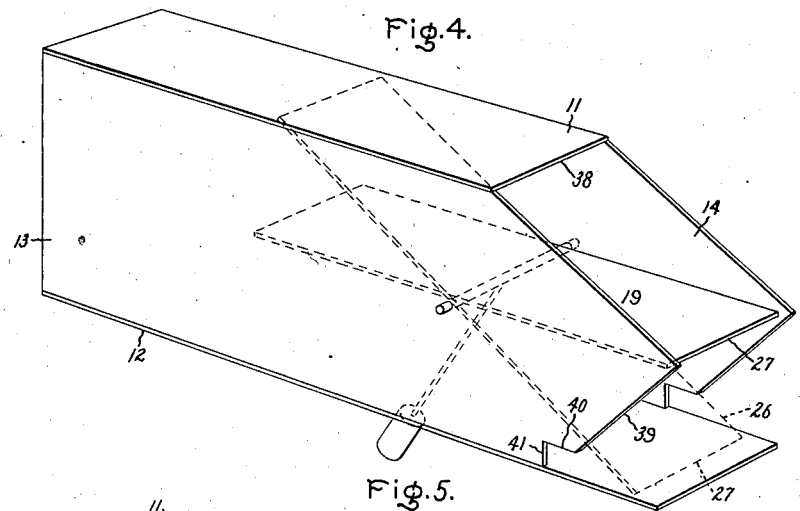
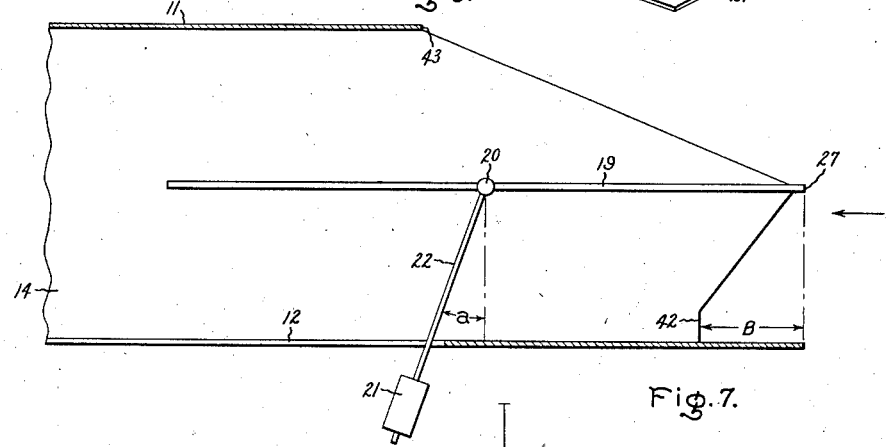
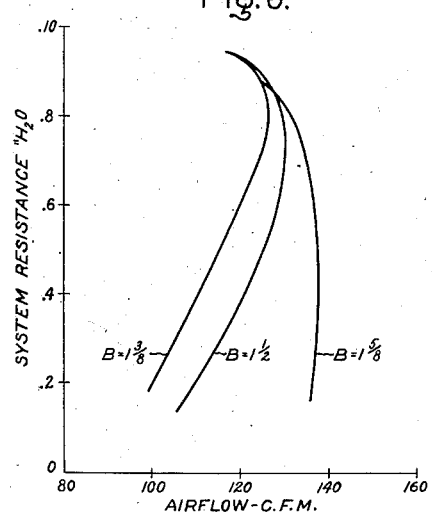
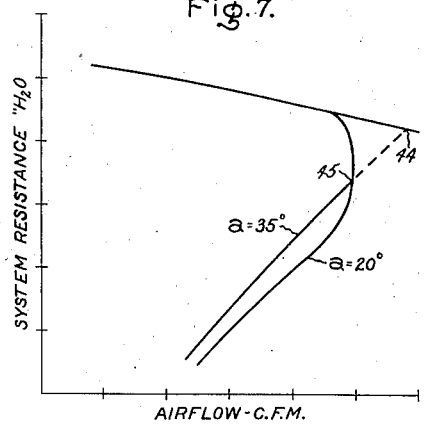
Inventor:
Ronald W. Olsen,
by Harry E. Dunham
His Attorney.

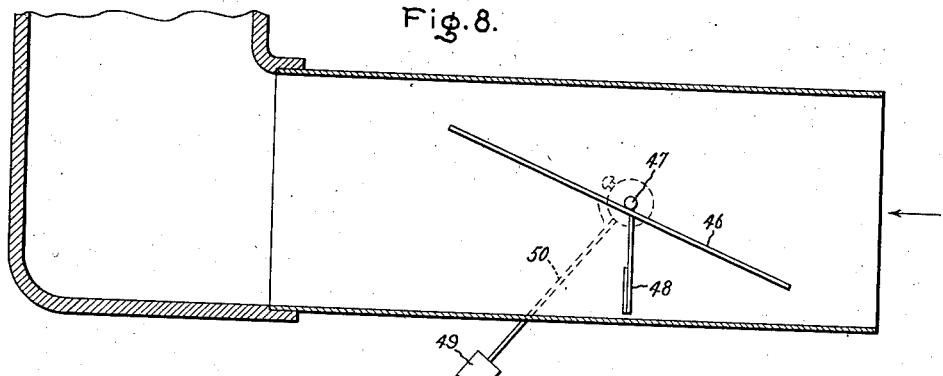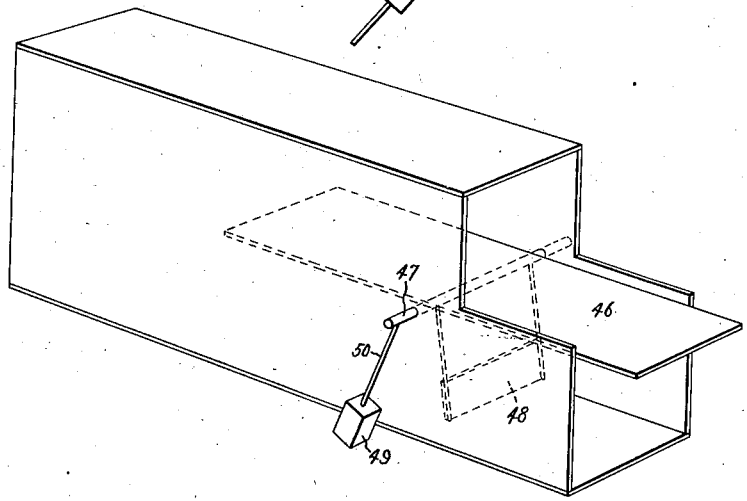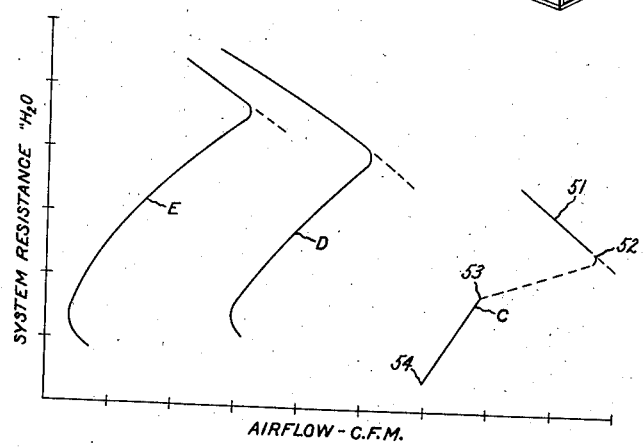

Patented Oct. 30, 1945

2,388,073

UNITED STATES PATENT OFFICE 2,388,073

FLUID FLOW CONTROL

Ronald W. Olsen, Bloomfield, N. J., assignor to General Electric Company, a corporation of New York Application April 29, 1941, Serial No. 390,961

4 Claims. (Cl. 137—152)

My invention relates to fluid flow controls and particularly to an improved self-balancing damper arrangement for controlling the rate of fluid flow to a device within a predetermined range upon variation in velocity of fluid flow, and although not limited thereto, it may be employed as an air flow control for a stoker.

Air flow controls have efficient application for controlling the flow of combustion air to a furnace, particularly when an automatic fuel feeding arrangement, such as a stoker, is employed. Heretofore, air flow control arrangements for stokers have included a damper arrangement in the duct which conducts the combustion air to the furnace, and multiple vanes, diaphragms, or linkages for controlling the movement of the damper in order to maintain the flow of air to the furnace within a predetermined range or at a substantially constant value during variations in the thickness of the fire bed.

It is, therefore, an object of my invention to provide an improved self-balancing damper lateral fluid flow directing arrangement for controlling the flow of a fluid within predetermined limits as a function of variations in the velocity of the fluid.

Another object of my invention is to provide an improved self-balancing damper and duct terminal wall arrangement for controlling the flow of air through a duct within a predetermined narrow range upon variation in the duct system resistance over a relatively wide range.

A further object of my invention is to provide an improved form of self-balancing damper air flow control capable of maintaining a substantially constant quantity of air per unit of time passing into a furnace upon relatively wide variation in either the thickness of the fire bed thereof or the speed of operation of the draft fan.

Further objects and advantages of my invention will become apparent from the following description referring to the accompanying drawings, and the features of novelty which characterize my invention will be pointed out with particularity in the claims annexed to and forming a part of this specification.

In the drawings, Fig. 1 is a perspective view in partial section of a duct having a fluid flow control which is provided with an embodiment of my invention; Fig. 2 is a side view of the control illustrated in Fig. 1; Fig. 3 includes curves to diagrammatically indicate characteristics of the control illustrated in Figs. 1 and 2; Fig. 4 illustrates a modification of the control illustrated in Figs. 1 and 2; Fig. 5 illustrates a modification of the control illustrated in Fig. 4; Figs. 6 and 7 include curves illustrating characteristics of the control illustrated in Fig. 5; Fig. 8 illustrates a control which is included for purposes of comparison with my invention; Fig. 9 illustrates a modification of the control illustrated in Fig. 6; Fig. 10 includes curves to illustrate comparative characteristics of the control of my invention with the control illustrated in Fig. 8; and Fig. 11 shows diagrammatically a furnace having an induced draft fan and provided with my improved air flow control for regulating the furnace draft.

In the arrangements illustrated in the drawings, fluid flow controls employing a self-balancing, flow dividing damper having leading and trailing ends are provided for controlling the amount of any suitable fluid, such as air passing into a duct, within suitable limits or within a predetermined range as a function of variations in the velocity of the air passing into the duct, or as a function of variations in the pressure differential between the intake and exhaust ends thereof. The control includes a centrally pivoted flow dividing damper having its leading end at the intake port of the duct and its trailing end within the duct, the damper being provided with a weight for biasing the damper to a central flow dividing position substantially lengthwise of the duct and for opposing movement thereof due to changes in velocity of the air. I have found that without such a biasing weight or equivalent biasing means for opposing the tilting of the damper in the duct, an unbiased freely tilting damper, even though pivoted midway of its length and balanced in the central flow dividing position lengthwise of an air flow duct, would not be stable because the least chance disturbance or eddy current in the air flow past the damper will cause the damper to tilt one way or the other from the central flow dividing position in the duct. The direction of tilting will depend upon which side of the flow dividing damper such chance air disturbance or eddy current happens to occur. When such an unbiased damper thus becomes tilted by the air flow from its central flow dividing position in the duct, an additional force is inherently produced by the velocity of the air flow past the damper at the downstream face of the leading half of the tilted damper similar to the "lift" produced over the leading portion of an airplane wing, and this additional inherent "lifting" force will not be balanced by any corresponding force produced at the downstream face of the trailing half of the tilted damper. Hence, when such an unbiased centrally pivoted tilting damper once starts to tilt from its central flow dividing position in the air flow duct, the unbalanced additional "lifting" force produced on the downstream face of the leading half thereof tends to continue the tilting movement. This unbalanced "lifting" force acting on the leading half of the tilting damper inherently depends upon both the velocity of the air flow past the leading end of the damper and the tilt of the damper. Thus the unbalanced "lifting" force tends to increase as a function of the tilt because the velocity of the air flow past both ends of the damper tends to increase considerably as the available flow area of the duct is decreased at both ends of the damper upon tilting of the damper in the duct. Consequently, if such an unbiased centrally pivoted tilting damper is made short enough to turn freely in the duct, it will very quickly tilt in response to the cumulative increase in velocity of the air flow past the tilting damper until it is exactly normal to the air flow, at which point all the air flow forces exerted on the damper will immediately become balanced.

My present fluid flow control invention utilizes the inherent unbalanced "lifting" force exerted on the leading half of a tilting damper in a fluid flow duct to obtain an improved automatic regulation of the fluid flow through the duct. Briefly, I provide the duct with an elongated centrally pivoted flow regulating damper having oppositely tilting leading and trailing halves, each preferably of about the same length as the height of the duct, so that only a limited tilting movement of the damper from a central flow dividing position in the duct is required to substantially close the duct, as indicated in the drawings. I also provide a variable biasing means for opposing the tilting movement of the damper in the duct, preferably in the form of an adjustable weight at the end of a lever arm such that the bias will increase as a cumulative function of the tilt of the damper from the central flow dividing position. Then to accurately control the flow regulating action of the biased damper as a function of the tilt within its limited tilting range, I provide predetermined off-center substantially opposing lateral flow currents into one half of the duct capable of being variably split upon the tilting of the leading end of the damper in a predetermined direction so as to produce predetermined variations in the unbalanced "lifting" force acting on the leading half of the tilting damper. Preferably, such off-center substantially opposing lateral flow currents are created by means of flow openings or channels that are specially formed off center in opposing relation in one half of the duct inlet terminal walls so as to constitute an irregular intake port for the duct. These openings or channels are placed on the opposite sides of the path of the leading end of the damper so that the tilting thereof will variably split the opposing currents and transfer an increasing portion of the opposing lateral flow currents into the duct from the downstream face of the tilting damper to the upstream face of the damper and thereby regulate the "lifting" force exerted on the damper.

In addition, I provide means for insuring that the damper will always be initially tilted by the air flow action in a predetermined direction from the central flow dividing position in the duct to which it is biased. A suitable auxiliary pilot vane may be provided for this purpose. But in a preferred form of the invention this is accomplished by offsetting one of the two duct inlet terminal walls facing the damper in the central flow dividing position thereof in such a way that a substantial portion of the leading end of the damper overlaps or extends beyond the offset duct inlet terminal wall. Thus the exposed overlapping portion of the leading end of the damper will initially be subjected to a substantially transverse flow current into the duct having an impact force component that is substantially normal to the face of the damper and thus tends to initiate the tilting of the damper always in one predetermined direction from the central flow dividing position to which it is biased in the duct.

Thus, by the improved principle of extending the leading end of the damper beyond one of the terminal walls of the duct and by cutting back part of the terminal walls of the duct to form opposing flow channels adjacent the path of the leading end of the damper, or by providing off-center opposing openings in the side walls of the duct near the leading end of the damper, I have found that without employing a pilot vane or mechanical damper control arrangements other than a variable biasing means for opposing the tilting movement thereof, the tilting damper is able to control the volume of the air flowing into the device or through the duct within a predetermined narrow range upon variations in the velocity of the air past the tilting damper over a wide range.

Referring more particularly to the drawings, I have illustrated in Fig. 1 a fluid flow control which may be adapted to control the flow of air and which includes a rectangular duct indicated generally by the numeral 10 having top and bottom panels 11 and 12, respectively, and side panels 13 and 14, all of which are specially formed to provide a plurality of irregular terminal walls demarcating a plurality of lateral air flow openings at the intake end of the duct, the special arrangement of these openings being described in detail hereinafter. A guard panel 15 is provided to partly enclose the intake end 16 of the duct and the exhaust end 17 of the duct may be connected to any suitable device or space wherein a controlled quantity of air per unit of time is desired to be conducted, such as a furnace. A panel 18 may be provided on one side of the duct for covering suitable electric control equipment such as switches and relays. Within the duct 10 a suitable flow dividing damper or vane 19 is provided which may be mounted for opposite tilting movement of the leading and trailing ends thereof in any suitable manner so as to control the size or area of each passageway through the duct on the opposite sides of the damper 19. Thus, a shaft 20 is mounted for rotational movement in the side walls 13 and 14 and substantially midway between the top and bottom walls 11 and 12 the damper 19 is connected substantially midway of its length to the pivot shaft 20 so that the opposite tilting movement of the leading and trailing ends of the damper varies the area of a passage on each side of the damper inside the duct 10 through which the controlled air passes. An inertia or biasing arrangement, such as a weight 21, is connected to the damper 19 through a bracket member 22 which is attached to the damper at any suitable point such as at 23. Movement of the damper 19 in the duct 10 will, therefore, be impeded by the weight 21. In this way the weight 21 serves to balance the damper 19 in a central position substantially lengthwise of the duct 10 so as to provide an air flow passage on each side of the damper that is variable in area upon tilting movement of the damper in response to variation in the velocity of air flow into the duct. By varying the relationship between the center of gravity of the weight 21 and the pivot point 20 the whole control range of my control may be varied. Therefore, by increasing the moment arm of the weight with respect to the pivot point 20 the rate of air flow may be increased or the range of the control moved. Conversely, by decreasing the effectiveness of the weight the rate of air flow may be decreased. It will be noted that the bracket 22 is at a slight angle with the plane of the damper, or, in other words, there is an angle $a$ between the axis of the bracket 22 and the vertical when the damper is horizontal, and variation of this angle $a$ may change a characteristic of my control, as will be brought out in more detail below. When there is no air passing through the duct the damper, since it is pivoted substantially at its mid-point, will assume a position at an angle to the horizontal substantially equal to $a$ and the axis of the bracket 22 will assume a substantially vertical position. In order to provide a simple way of conveniently varying the relation of the weight to the pivot, the weight 30 may be slidably mounted on the bracket and a bolt 24 provided for locking the weight in any suitable position. A cutout portion 25 is provided in the bottom panel 12 so that the bracket 22 may move freely when the damper or vane 19 moves from the position as shown in Figs. 1 and 2 to the dotted line position indicated by the numeral 26 in Fig. 2. Thus, as the velocity of the air flowing through the duct increases, or as the pressure differential that produces the air flow increases, the damper will move from its position, indicated by the full lines, which gives a substantially maximum area for the passageway, until with some predetermined value of the velocity of the air, the damper will assume a position indicated by the dotted lines, which is the point of substantially minimum passageway area. It will be seen as the description proceeds that the damper may assume any suitable position between these two limits, this position depending upon the resistance of the system to which the duct is connected when there is a substantially constant pressure differential tending to produce air flow.

In furnaces it is desirable to control the amount of air flowing to the stack. Thus, in a domestic furnace which employs a fuel such as coal, the fire bed will have a normal thickness for which it is most practical to operate. Under these conditions, a predetermined amount of air per unit of time for combustion is necessary. In domestic furnaces, and particularly those which employ a stoker for automatically feeding the coal to a furnace, a fan is usually employed to maintain a forced or induced draft into the furnace. Since the motor employed to rotate the fan is usually of a constant speed, it will be seen that if a very low flow resistance is present, that is, a very thin fire, a relatively large quantity of air will be forced through the furnace, if no control is provided; while when a large or thick fire obtains, a relatively small amount of air would be forced into the furnace. It is readily apparent, therefore, that in furnaces it is desirable to control the combustion air so that a substantially constant quantity of air is conducted into the furnace, or an amount within predetermined narrow limits even though there are considerable variations in the thickness of the fire bed, or the system resistance. It may also be desirable to provide such a control system that, during periods of very thin fire, a relatively smaller amount of air will be conducted to the furnace than is conducted thereto when a relatively thick fire bed is present in the furnace.

I have found that by providing a plurality of specially disposed lateral air flow inlet openings in the duct adjacent the leading end of the damper 19 that I am able to control the rate of air flowing through the duct as a function of variations in its velocity. By the leading end of the damper, I mean the end which is nearest the intake end 16 of the duct 10 and thus serves to divide the air flowing into the duct. Thus, by extending the leading end 27 beyond the end 28 of the bottom panel 12, I have in effect provided an upwardly directed lateral air flow inlet opening, which is indicated generally by the numeral 29, in that part of the wall of the duct away from which the leading end 27 of the damper 19 moves with an increase in the velocity of the air passing through the duct. I have also provided a lateral air flow inlet opening, indicated by the numeral 30, in the side wall 13 which is bounded by edges 31 and 32, and a similar opposing lateral air flow inlet opening, indicated by the numeral 33, in the side wall 14 of the duct 10. These opposing lateral air flow inlet openings 30 and 33 in the side walls of the duct are provided in that half of the duct which is adjacent to and extends along the sides of the path through which the leading end 27 of the damper 19 passes during its movement from the full line position indicated in Fig. 2 to its dotted line position 26. The opposing lateral air flow inlet openings 30 and 33 may be of any suitable size, so long as when the damper 19 assumes the position indicated by the lines 26 that there will be a part of the opposing lateral air flow inlet openings acting to admit lateral air flow to both of the flat faces of the damper 19. In other words, the end 27 of the damper must extend beyond the edge 31 so that when the damper 19 assumes the substantially closed position, there will be a portion of the openings 30 and 33, as indicated by the letter A, open to that face of the damper adjacent the panel 11. In this way the leading end of damper 19 will variably split the opposing lateral flow into the upper half of the duct through openings 30 and 33 upon tilting of the damper and thereby regulate the tilting in accordance with variations in the velocity of flow past the damper. I have, therefore, found by providing a plurality of lateral air flow inlet openings in the walls of the duct with an opposing pair thereof located off center in one half of the duct in planes perpendicular to the face of the damper 19 and extending along the sides of the path through which the leading end 27 of the damper 19 passes during its tilting movement, and with a separate opening parallel to one face of the leading end of the damper when it is in its mid-position as illustrated in Figs. 1 and 2, that the quantity of air flowing through the duct 10 may be controlled within predetermined limits as a function of variations in the velocity of the air past the damper. So long as the end guard panel 15 is a reasonable distance beyond the end 27 of the damper 19 I have found that it makes little difference in the characteristics of my control whether the panel 15 is present or not. As will be described in detail below in connection with Figs. 6, by varying the distance that the end 27 extends out beyond the edge 31 of the side panel 13 I am able to vary the characteristics of my air flow control.

The pressure differential between the intake 16 and the exhaust end 17 of the duct 10 that tends to produce air flow therethrough may be obtained in any suitable manner, depending upon the installation to which my control is connected. Let us assume that the exhaust end 17 of the duct is connected to the retort chamber of a furnace 60 and that a variable speed fan 61 is connected to the flue of the furnace as indicated in Fig. 11 so as to produce a maximum induced draft of a certain amount for low fan speed, and a maximum induced draft of another amount for higher fan speed as indicated in Fig. 3. Ordinarily, a furnace will have only a single speed fan, but I have described the duct 10 as connected to a variable speed fan merely to bring out more clearly the characteristics of my improved control for different pressure differentials. The amount of air flow in cubic feet per minute for different system resistances for high and low speeds is, therefore, indicated by the curves in Fig. 3, in which the full line curves are for high fan speeds and the dotted line curves are for low fan speeds. Curves 34 and 35 are for one position of the counterweight 21 for high and low fan speeds, while curves 36 and 37 are for a position with the counterweight further away from the pivot 20, for high and low fan speeds. It will be seen, therefore, from an inspection of these curves that my air flow control may be designed to produce a substantially constant flow of air, or a flow of air within the same range, in cubic feet per minute over a relatively wide range of system resistance. Furthermore, it will be seen that a substantial change in fan speed or pressure differential affects only to a very small extent the amount of air in cubic feet per minute which is conducted into the furnace. Thus, my air flow control with one setting of the counterweight may be employed on systems which have different types of fans with different capacities without changing the characteristics appreciably of my air flow control. The operation of the improved air flow control shown in Figs. 1 and 2 is as follows. When a flow producing pressure differential is established between the intake and exhaust ends of duct 10, the resulting air flow current passing into the lower half of duct 10 through the bottom opening 29 is upwardly directed transversely of the duct and thus provides a velocity component normal to the opposing face of the leading end of the damper 19. When the air flow velocity increases above a predetermined value, this upward component overcomes the bias of weight 21 on the damper 19. A tilting movement of the damper is thereby initiated in the predetermined direction that will carry the leading end of the damper between the opposing openings 30 and 33 that admit most of the air flow into the upper half of the duct when the damper is in the central flow dividing position. As the damper 19 thus tilts from the central flow dividing position to which it is biased by the adjustable biasing weight 21, an additional "lifting" force is inherently produced by the increased velocity of the air flow past the leading end of the tilted damper into the upper half of the duct 10. This "lifting" force is similar to the "lift" produced over the leading portion of an airplane wing and, consequently, is dependent upon both the velocity of the air flow past the damper and the tilt of the damper 19 in duct 10. But the tilting of the damper automatically regulates the additional "lifting" force by variably splitting the substantially opposing air flow currents passing into the duct through the opposing openings 30 and 33 as the leading end of damper 19 moves across these openings. This variable flow splitting action enables the tilting of the damper to regulate the volume of the air flow through the duct 10 within predetermined limits by regulating the additional "lifting" force so that it will be counterbalanced by the increasing biasing force exerted by weight 21 due to the increasing leverage provided by the lever arm 22 upon the tilting of the damper. In this way the damper can automatically tilt over a predetermined range in accordance with variations in the velocity of the air flow past the damper to provide the substantially constant volume duct air flow regulating characteristics shown in the curves of Fig. 3.

It is to be understood that a variety of shapes of lateral air flow inlet openings in the irregular terminal walls of the duct 10 may be provided, and in Fig. 4 I have illustrated a duct with different openings than those of Figs. 1 and 2. It will, also, be seen that the duct in Fig. 4 is turned over 180 degrees from that illustrated in Figs. 1 and 2 so that the leading end 27 of the damper 19 extends beyond the end 38 of the top panel 11 so as to move away therefrom instead of the bottom panel, while the opposing lateral air flow inlet openings in the side panels 13 and 14 are provided near the bottom thereof, instead of near the top as provided in the side panels in the air flow control illustrated in Figs. 1 and 2. In each case, however, the pair of opposing lateral air flow inlet openings are on the opposite side of the flow dividing damper when in substantially the mid position to which it is biased from the lateral air flow inlet openings away from which the leading end of the damper moves. Thus, the ends of the side panels 13 and 14 adjacent the leading end 27 of the damper 19 are cut back so that when the damper 19 assumes its relatively closed position, as indicated by the dotted lines 26, a suitable portion of the leading end 27 will be seen from a side view. Thus, the air may freely pass laterally from each of the opposing lateral air flow inlet openings to both flat faces of the damper 19 when it is in its closed position. The side panels 13 and 14 are, therefore, cut back at edges 39, 40 and 41 in order to provide the pair of opposing lateral air flow inlet openings in the side panels adjacent to and extending along the sides of the path which is traversed by the leading end 27 of the damper 19 during its movement between its relatively closed and open position.

Fig. 5 illustrates another configuration of a pair of opposing lateral air flow inlet openings in the side walls 13 and 14 adjacent the path traversed by the leading end 27 of the damper 19. As has been stated above, the amount which the leading end 27 of the damper 19 extends beyond the edge 42 of the side panel 13 determines the resulting control characteristics of the air flow regulator. The curves in Fig. 6 illustrate the variations in the control characteristics in air flow in cubic feet per minute during variations in the static pressure of the system or system resistance.

for variations in the dimension indicated by B, which is the distance that the leading end 27 extends out beyond the side edge 42 of the side panels 13 and 14. In Figs. 1 and 2 the amount that the end 27 extends beyond edge 31 is equivalent to dimension B in that design. Let us assume, for example, that the duct is so dimensioned that the width of the top and bottom panels 11 and 12 is 4 inches, that the width of the side panels 13 and 14 is 5 inches, that the damper is 10 inches in length and is pivoted at 20 at its midpoint and half way between the top and bottom panels in the side panels 13 and 14, that the edge 43 of the top panel 11 extends one inch back from the pivot 20, and that the length of the edge 42 is one-half inch. The three curves in Fig. 6 indicate the change in cubic feet per minute air flow over a system resistance which may vary between zero and one inch of water, when dimension B is equal to 1⅜ inches, 1½ inches, and 1⅝ inches. With the dimension B equal to 1⅝ inches, the air flow for a system resistance from 0.6 of an inch to about 0.2 of an inch is practically constant, while with the smaller projections of the leading edge 27 the air flow control has a negative characteristic, or as the system resistance decreases the amount of cubic feet per minute passing through the duct also decreases. Such a characteristic is sometimes desirable in a stoker operated furnace since less air may be needed for a very thin fire, as this results in a minimum of fly ash. The above dimensions are only intended by way of example, and it is apparent that any other suitable relations in the dimensions may be had.

Fig. 7 is included to indicate the variation in control characteristics for different angles of the weight arm 22 to the vertical. When the angle $a$ is equal to 20 degrees a smooth curve is provided, while when the angle is 35 degrees there is a jump in the curve between the points 44 and 45 on the curve of 35 degrees. However, over a large part of the range of system resistance the control is approximately the same for both angles.

Figs. 8 and 9 and the curves in Fig. 10 are included to show the unexpected improvement in air flow control with my improved device over that which would result if a control vane were employed and no openings provided near the leading edge of the damper. Thus, in Fig. 8 a damper 46 is pivoted on a shaft 47 and is provided with a control vane 48 and a weight 49 connected through a lever 50. The characteristics of the damper in Fig. 8 are illustrated by curve C of Fig. 10. Thus, with the damper open the variations in cubic feet per minute for changes in resistance of the system will be along the portion 51 of the curve. However, when a particular point 52 is reached, the damper will jump to a particular position and then regulate over the small range as indicated between the points 53 and 54. Curve D of Fig. 10, however, indicates the relative improvement obtained in the control characteristics when the leading edge of the damper extends beyond the intake end of the duct 10 and when the duct is cut away, as illustrated in Fig. 9, while the curve E of Fig. 10 indicates the improved result obtained when the control vane 48 of Fig. 9 is removed. The curves C, D, and E of Fig. 11, therefore, indicate the unexpected increase in the range of control when no control vane is employed and when openings are provided in the sides of the duct adjacent that portion through which the leading edge of the damper moves, and in the wall of the duct away from which the leading edge moves, as the system resistance is changed. It may also be seen from these curves that with my improved control, the range of control is not only much greater, but that this range may be had between limits of C. F. M. which are relatively small. In other words, with my invention a relatively wide control range may be had with a relatively small effective counterweight.

I have described my invention and indicated its application to an air flow control for a furnace; however, it is to be understood that my invention is not limited to this application, but may be employed whenever a control of air for variations in velocity is desired. Thus, my improved air flow control may be employed in a duct which conducts air into a room or space. Furthermore, it is to be understood my invention is applicable for the control of the flow of any other suitable gas or liquid, or other suitable fluid.

In view of the foregoing, it will be seen that I have provided an improved fluid flow control for controlling the amount of fluid flowing per unit of time for variations in pressure differential so that the rate of fluid flow may be controlled within predetermined limits.

Although I have shown and described particular embodiments of my invention, I do not desire to be limited to the particular embodiments described, and I intend in the appended claims to cover all modifications which do not depart from the spirit and scope of my invention.

What I claim as new and desire to secure by Letters Patent of the United States is:

1. In a fluid flow system, the combination of a rectangular duct having one half of the inlet end thereof provided with inlet flow directing edges in opposing alignment and having an offset inlet opening formed in the opposite half thereof, and a centrally pivoted rectangular damper biased lengthwise in said duct to divide the flow between said halves and angularly movable in response to said divided flow to regulate said flow and having the leading end thereof substantially facing said opening and angularly movable between and extending beyond said edges to control the regulating range of said damper.

2. A fluid flow control including an elongated rectangular pivoted vane having a central transverse pivot axis and an adjustable weighted member angularly movable with said vane about said axis for controlling the angular position of said vane, a rectangular duct having said vane angularly movable therein with said axis extending centrally across said duct and with said weighted member biasing said vane to a position substantially lengthwise of said duct, and said duct having a flow directing inlet on one side of the leading end of said vane for initiating angular movement of said vane from said position to a plurality of other angular positions in said duct upon fluid flow through said duct to regulate said flow, and having opposing inlet flow directing edges disposed in a predetermined alignment along the sides of the path traversed by said leading end of said vane for jointly controlling with said weighted member the fluid flow condition effective to angularly move said vane to each of said other positions.

3. A fluid flow control including a rectangular vane having a central transverse axis and biasing means variable upon angular movement of said vane for controlling said movement, a rectangular duct having said vane angularly movable therein with said axis extending centrally across said duct and with said biasing means biasing said vane to a position substantially lengthwise of said duct, and said duct having an inlet provided with flow directing edges for initiating angular movement of said vane from said position to a plurality of other angular positions in response to flow through said duct for regulating the fluid pressure drop through said duct and with opposing inlet flow directing edges extending along the sides of the path traversed by said leading end of said vane for maintaining within a predetermined limited range the rate of fluid flow through said duct effective to move said vane to each of said other angular positions.

4. In combination, a fluid flow duct having offset inlet flow directing means for admitting substantially opposing convergent currents laterally into one half of said duct and a transversely convergent current into the other half of said duct, and a pivoted damper extending lengthwise of said duct and having the axis thereof midway between the ends of said damper and extending centrally across said duct for limited angular movement of said damper about said axis to regulate the flow through said duct and having means for variably biasing said damper to a central position in said duct with the leading end thereof in the path of said transversely convergent current to be moved thereby for variably splitting said opposing convergent currents to control the flow regulating range of said damper.

RONALD W. OLSEN.